United States Patent
González Vogel et al.

(10) Patent No.: US 11,666,863 B2
(45) Date of Patent: Jun. 6, 2023

(54) METHOD AND DEVICE FOR ASYMMETRIC POLARITY INVERSION IN ELECTROMEMBRANE PROCESSES

(71) Applicant: INVESTIGACIONES FORESTALES BIOFOREST S.A., Concepción (CL)

(72) Inventors: Álvaro Mauricio González Vogel, Concepción (CL); Olli Pekka Joutsimo, Lappeenranta (FI); Klaus Erwin Bornhardt Brachmann, Concepción (CL)

(73) Assignee: INVESTIGACIONES FORESTALES BIOFOREST S.A., Concepción (CL)

( * ) Notice: Subject to any disclaimer, the term of this patent is extended or adjusted under 35 U.S.C. 154(b) by 611 days.

(21) Appl. No.: 16/632,166

(22) PCT Filed: Jul. 18, 2017

(86) PCT No.: PCT/CL2017/050033
§ 371 (c)(1),
(2) Date: Jan. 17, 2020

(87) PCT Pub. No.: WO2019/014781
PCT Pub. Date: Jan. 24, 2019

(65) Prior Publication Data
US 2020/0230555 A1    Jul. 23, 2020

(51) Int. Cl.
*B01D 61/52* (2006.01)
*B01D 61/44* (2006.01)
*B01D 61/54* (2006.01)

(52) U.S. Cl.
CPC .......... *B01D 61/52* (2013.01); *B01D 61/445* (2013.01); *B01D 61/54* (2013.01);
(Continued)

(58) Field of Classification Search
CPC .... C02F 2201/4613; C02F 2201/46175; C02F 2201/46115; C02F 1/4691; C02F 1/4693;
(Continued)

(56) References Cited

U.S. PATENT DOCUMENTS 3,029,196 A * 4/1962 Perlmutter ............ C02F 1/4693
                                                          204/529
8,038,867 B2   10/2011 Du et al.
(Continued)

FOREIGN PATENT DOCUMENTS

CN          104022676       9/2014
JP          4591703         12/2010
(Continued)

OTHER PUBLICATIONS

International Search Report dated Dec. 15, 2017, directed to International Application No. PCT/CL2017/050033; 4 pages.

*Primary Examiner* — Salil Jain
(74) *Attorney, Agent, or Firm* — Morrison & Foerster LLP (57) ABSTRACT

Methods and circuits for a device for interrupting concentration-related polarisation phenomenon and for self-cleaning of electromembrane processes by application of asymmetric inverse-polarity pulses with high intensity and variable frequency are described. The device, a bipolar switch, is based on the use of solid-state electronics to carry out polarity inversion in a range of frequencies, intensities and pulse widths to prevent or reduce formation of precipitates on the surfaces of the membranes. The inversion protocol, with a frequency that varies as a function of the appearance of dirt on the membranes, as measured by the decrease in voltage or electrical resistance of the membrane cell during electromembrane processes, is also provided. This device and configuration provides application of modulated and stable high-intensity pulses using a second power (Continued)

source. Electromembrane processes can be updated by replacing electrodes, suitable for polarity inversion, and adding a second power source and the bipolar switch described.

12 Claims, 5 Drawing Sheets

(52) U.S. Cl.
CPC .............................. *B01D 2321/223* (2013.01); *C02F 2201/4613* (2013.01); *C02F 2201/46175* (2013.01)

(58) Field of Classification Search
CPC ....... C02F 1/4695; B01D 65/02; B01D 65/08; B01D 61/44; B01D 61/445; B01D 61/48; B01D 61/50; B01D 61/52; B01D 61/54; B01D 61/56
See application file for complete search history.

(56) References Cited

U.S. PATENT DOCUMENTS

| 9,207,208 | B2 | 12/2015 | Zhong et al. | |
|---|---|---|---|---|
| 2009/0314655 | A1* | 12/2009 | Field | A47L 13/26 |
| | | | | 205/744 |
| 2014/0254204 | A1 | 9/2014 | Kao et al. | |
| 2015/0096891 | A1* | 4/2015 | Sparrow | B01D 61/50 |
| | | | | 204/522 |
| 2016/0228820 | A1* | 8/2016 | Hayes | B01D 61/52 |
| 2016/0272516 | A1* | 9/2016 | Wood | C02F 1/4691 |

FOREIGN PATENT DOCUMENTS

| WO | WO-2007095072 A1 * | 8/2007 | ............ A47L 11/302 |
|---|---|---|---|
| WO | 2010/143945 | 12/2010 | |
| WO | WO-2010143945 A1 * | 12/2010 | ............ B01D 61/52 |
| WO | 2011/056066 | 5/2011 | |
| WO | WO-2011056066 A1 * | 5/2011 | ............ B01D 35/06 |
| WO | WO-2012019016 A2 * | 2/2012 | ............ C02F 1/4674 |

* cited by examiner

METHOD AND DEVICE FOR ASYMMETRIC POLARITY INVERSION IN ELECTROMEMBRANE PROCESSES

CROSS-REFERENCE TO RELATED APPLICATIONS

This application is a U.S. National Phase patent application of International Application No. PCT/CL2017/050033, filed Jul. 18, 2017, the entire contents of which is incorporated herein by reference.

FIELD OF THE DISCLOSURE

The embodiments of the invention refer to the field of mitigation of fouling and scale and the interruption of concentration polarization in electromembrane (EM) processes such as conventional electrodialysis (ED), reversible electrodialysis (EDR, in which the polarity is reversed every 15-30 minutes for self-cleaning of the membranes), bipolar membrane electrodialysis (BMED), capacitive deionization (CDI), electrodeionization (EDI), reverse electrodialysis (RED, in which saline gradients are used to obtain energy), microbial fuel cell (MFC) systems, desalinization with ion concentration polarization (ICP) and such improved operations associated with all the above-mentioned systems.

BACKGROUND OF THE DISCLOSURE

Currently, the fouling and scaling of electromembrane processes continue to be problems that limit the application of these technologies. Mitigation of the fouling and scale by polarity inversion is a strategy commonly used in EDR operations; the inversion function is applied every 15 to 30 minutes, where each time the electrical polarity is inverted, the compartments of demineralized water change to be compartments of concentrate and vice versa. This operation also requires a change in the respective trajectory of the hydraulic flow. This results in the need for a complicated hydraulic flow and control with automatic valves that takes at least 40 seconds. The resulting loss in time and the mixture of the product with the rejection current is an inevitable loss that represents around 5% of total production. Consequently, EDR is not used for production of fine chemicals due to the loss of time, labor and valuable products. Furthermore, concentration polarization is a phenomenon inherent in EM processes that also restricts the operation of such systems. At some point, when the electrical current passing through the system is increased, a limit is eventually reached due to the concentration polarization. In the operation of EM processes this value is called limit current density (LCD) which depends on many parameters, so is normally determined empirically. When working with LCD values (or above that value), the pH gets out of control in the EM cell due to the dissociation of the water, causing problems of scale and fouling. In practice, only 80-90% of the LCD is applied. It is generally desirable to increase these LCD values so as to intensify the processes, reducing the area of the membrane to use and consequently the size of the equipment and capital cost.

The use of direct-current cycles was described in patent U.S. Pat. No. 3,029,196 more than 50 years ago. Patent U.S. Pat. No. 8,038,867 B2 refers to an ambiguous application of electrical pulses in electrodialysis, with no detail mention about a device for carrying out the methodology. Application WO 2010/143945 refers to a membrane self-cleaning method using the inversion of electrical pulses for ED, RED, CDI and MFC. This description mentions and electrodialysis device, but no apparatus was described for producing a pulsed electrical field (PEF). Application WO 2010/143945 claims a device and method for cleaning membranes using inverse polarity electrical pulses. However, it only mentions a generation of functions for the application of pulse widths, with no details about the electronic circuits used. This application does not describe the application of asymmetric pulses based on the parameters of the process, the use of an H-bridge, or how the intensity, frequency and width of the pulses are modulated. Patent application US 2016/228820 refers to a method for improving the performance of electrodialysis using different methods, among which pulsed reverse polarity as described. The authors mention that the application of pulses is only for cleaning the electrodes and that it is not necessary to change the electronics and hydraulics of the systems. There is no reference about the use of any H-bridge, interruption of the fouling and scaling on the surfaces of the membranes using asymmetric pulses, and the variation of the frequency, intensity and pulse width with respect to the electrical resistance of the cell when it is in operation.

Furthermore, document CN 104.022.676 describes a method for producing asymmetric pulse square waves using a half-bridge configuration with MOSFETs and a power source. The circuitry is completely different with the configuration of an H-bridge (full bridge) supplied by two power sources. Moreover, the purpose of the device is the generation of pulse width modulation (PWM), with no mention of application to EM processes. The patent application US 2014/0254204 relates to a DC/DC (direct current/direct current) converter based on a half-bridge configuration for achieving a zero voltage operation using asymmetric pulses. The circuitry and application described in this document are completely different from the present invention.

SUMMARY OF THE DISCLOSURE

Consequently, a device is desirable it makes it possible to upgrade the EM processes, reducing the occurrence of fouling and scale, increasing the LCD value by disruption of the concentration polarization phenomenon, and increasing the electrical and hydraulic polarity reversal cycle in EDR. This requires a pair of suitable electrodes for inversion of the polarity, such as those that the EDR has, a second power source and the described device. This device can be incorporated into power sources for application of asymmetric inverse polarity pulses with variable frequency, pulse width and intensities. The term asymmetric refers to the dynamic variation of the frequency, width (time) and intensity of the pulses, according to the requirements of each system.

Dirt in electromembrane technologies can be avoided by the periodic inversion of the electrical polarity with variable frequencies and intensities, provided they have suitable inversion electrodes (both can be used as anode or cathode), a second power source and a bipolar switch designed for this type of application. The reverse polarity pulses interrupt the formation of new mineral scale and dirt with organic material, avoiding the irreversible damage to the ionic exchange membranes and bipolar membranes. Furthermore, the periodic pulses of inverse polarity interrupt the phenomenon of concentration polarization, by means of generating turbulence, allowing an increase in the intensity of the process due to the greater limit current densities (LCD) that can be achieved. Moreover, the interruption of the concentration polarization helps establish the pH values, resulting in a decrease in the appearance of scale.

For EM processes, this change in polarity must be applied as asymmetric pulses with variable frequency, short pulse widths and intensities greater than normal operating values. Thus, a suitable bipolar switch is required, designed for processes with EM, that is simple and of low cost in terms of capital investment, installation and operating costs. Unlike EDR, with the use of asymmetric pulses, changes would not be required in the hydraulic flows and consequently use of automatic valves with complex flow trajectories.

According to some embodiments, a bipolar switch is based on an H-bridge configuration, a technique used in electric motors for changing the direction of rotation. This is the first time that an H-bridge is used in electromembrane systems, and the H-bridge is supplied by two different power supplies for adjustment of the intensity of the inverse polarity pulses. Moreover, it is the first time that frequency, intensities and pulse widths may be adjusted automatically according to the characteristics of the process. The method enables the inversion of polarity in a variety of electromembrane systems, reducing the addition of chemicals and maintenance of the systems, increasing the stability and working life of the membranes, and intensifying the process (with high limit current densities) through the disruption of the concentration polarization phenomenon.

According to some embodiments, system described includes one or two power sources (of supply or energy), a bipolar switch and an EM cell. Electromembrane cell is a general term that includes a variety of previously mentioned processes, in which only one power sources used if the intensity of the pulse is not adjusted and two power sources are used if the intensity of the pulse is increased or if pauses are carried out. This cell contains two electrodes and a set of membranes, usually ion exchange membranes and/or bipolar membranes. The electrodes in the electromembrane cells must be suitable for working as cathode and anode, reducing the risk of deterioration during inversion of the polarity. According to some embodiments, the second power source enables the intensity of the pulses to be adjusted, if this function is to be included. The power source(s) delivers energy to the electromembrane cell through the bipolar switch. A direct current passes through the bipolar switch, controlling the direction of this current. The electric energy is received by the electrodes where redox reactions take place. An electrochemical potential is generated in the electrodes, inducing the movement of ions toward different compartments of the cell, the disassociation of water molecules, etc. According to some embodiments, the electrochemical potential generated by the saline gradients can produce electric energy, in which case a fraction of the energy produced can be used for periodic self-cleaning of the membranes and as a method of cleaning in place (CIP).

DETAILED DESCRIPTION OF THE DISCLOSURE

According to some embodiments, the invention relates to a method for asymmetric polarity inversion in order to mitigate the dirt and scale on the membrane surfaces and the interruption of the concentration polarization in electromembrane processes, that comprises the steps of: providing an electromembrane cell (4), which comprises a pair of electrodes suitable for polarity and version, one electrode that acts as anode (5) and the other as cathode (6), and a set of membrane; providing a bipolar switch that comprises at least 4 solid-state electronic elements, with an H-bridge configuration for directing the electrical current, wherein under normal operating conditions some elements (8 and 11, are closed, and other elements (9 and 10) are opened in order to give the respective direction to the current; providing a device that varies the frequency of application of reverse polarity and pulse width, according to the requirements of the system when the EM process is running; providing one or two power sources different from each other for adjustment of the intensity of the pulses, in order to deliver energy to the electromembrane cell, wherein one of the sources (1) promotes the electromembrane process under normal conditions and the other source (2) promotes the application of reverse polarity pulses in the electromembrane cell; passing a direct current through the bipolar switch in different directions to the electrodes in which redox reactions take place; generating an electrochemical potential in the electrodes in order to induce the movement of the ions toward different compartments of the cell; providing a microcontroller or a pulse generator which will instruct the switch to change polarity; continuously measuring the voltage drop and/or electrical resistance in the electromembrane cell; defining a threshold value for the voltage drop and/or for the electrical resistance of the electromembrane cell; cleaning the membranes once said threshold value has been reached, by application of inverse polarity asymmetric pulses with variable frequency, short pulse widths and preferably with intensities greater than those of the operation under normal conditions or application of paused pulses.

According to some embodiments, the invention relates to a system for asymmetric inversion of polarity in order to mitigate the dirt and scale on the membrane surfaces and the interruption of concentration polarization in electromembrane processes, which comprises: an electromembrane cell (4) that comprises a pair of electrodes suitable for inversion of the polarity, where one acts as anode (5) and the other acts as cathode (6) and a set of membranes; a bipolar switch (3) that comprises at least four solid-state electronic elements (8, 9, 10, 11), with an H-bridge configuration for directing the electric current, wherein 2 of said elements are closed (8 and 11) and the other 2 are open (9 and 10); a device that varies the frequency of application of the reverse polarity and pulse width, according to the requirements of the system when the processes running; one or two power sources (1, 2) different from each other for adjusting the intensity of the pulses, in order to deliver energy to the electromembrane cell (4); a microcontroller or a pulse generator which will instruct the switch to change polarity, according to the variables of the process, wherein the microcontroller is incorporated in the circuitry of the bipolar switch (3); wherein the bipolar switch (3) can be located within the power sources (1, 2) or between the power sources (1, 2) and the electromembrane cell (4).

The microcontroller will be able to incorporate information from the process and adjust the intensity, frequency and pulse width, according to the requirement of the process. A pulse generator will be able to control the polarity reversal with a fixed frequency, intensity and pulse width, with no possibility of automatic adjustment according to the requirements of the process.

Figure 1:
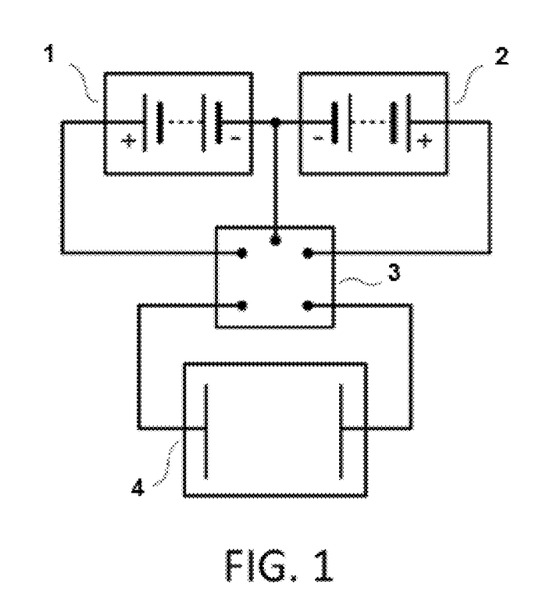
FIG. 1 is a schematic representation of an electromembrane process coupled to a bipolar switch for periodically inverting the polarity.

FIG. 1 shows a general view of an electromembrane process upgraded through the use of a bipolar switch 3 for periodically inverting the polarity in the cell 4. The intensity of the pulses can be adjusted with a second power source 2, while the normal operation is energized by 1.

Figure 2:
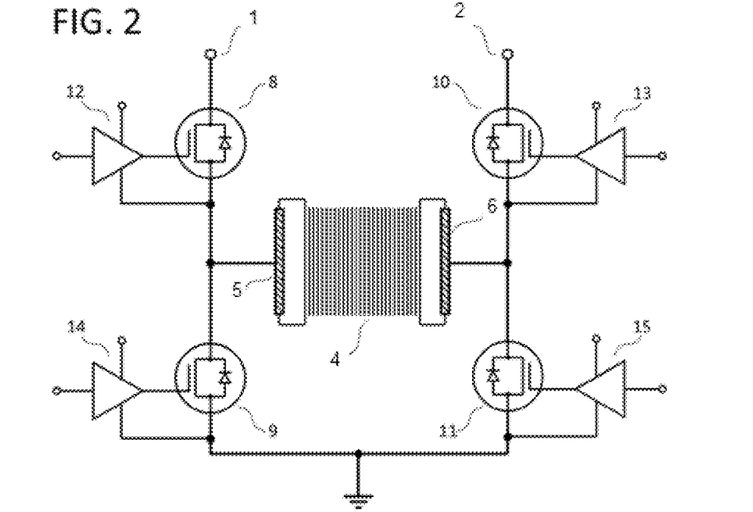
FIG. 2 is the circuitry of an H-bridge for inversion of the polarity in the electromembrane processes, with variable intensity, using a second power source.

FIG. 2 is a schematic diagram according to some embodiments of the invention. A microcontroller or a pulse generator (not shown in the figure) controls the opening and closing of the H-bridge elements through the circuits 12, 13, 14 and 15, based on an optimal condition previously established for a specific process, or automated by means of continuous measurements of the voltage drop or of the electrical resistance in the electromembrane cell 4. The process is usually carried out with the power source 1, while the power source 2 is used for the application of high intensity pulses. Both power sources share the same ground 7.

Normal operation is described in the following way: A power source 1 continuously promotes the electromembrane process in the cell 4, with a specific current voltage/density. An electrode 5 works as anode and the electrode 6 as cathode. There are at least four solid-state elements 8, 9, 10 and 11. At this time, the elements 8 and 11 are closed, and 10 and 9 are open. All the solid-state elements mentioned may have freewheeling diodes to protect them from counter-electromotive forces generated by the saline gradients between the compartments of the cell.

For inverse polarity pulses of greater intensity than in a normal operation: A power source 1 promotes the electromembrane process in the cell 4 when polarity inversion is applied using the second power source 2, promoting the process for a short time with a greater intensity than the one used with the power source 1. The electrode 5 functions as cathode and the electrode 6 as anode. At this time the solid-state elements 8 and 11 are open, and 9 and 10 are closed. This polarity in version can be programmed in the microcontroller or in the pulse generator. The polarity and version can be considered as a pulse width and application frequency of $10^{-2}$ to $10^3$ Hz and a pulse width varying from $10^{-5}$ to $10^0$ seconds. The frequency, pulse width and amplitude or intensity are parameters that may be defined depending on the occurrence of the scale and the chemical nature of the precipitates. If the power source 1 is used both in normal operation as well as in the polarity inversion, the pulse width and/or frequency must be variable in order to maintain an optimal performance of the electromembrane process in terms of mitigation of dirt or scale, throughout the entire time of operation. If the purpose of the pulses is only the intensification of the process through the interruption of the concentration polarization, the frequency of the pulses applied can be maintained fixed.

For paused pulses: A power source 1 promotes the electromembrane process in the cell 4 when a pause (off state) is applied. At this time all the solid-state elements 8 to 11 are open for the respective pause time. The pauses can be considered as a pulse applied every $10^0$ to $10^3$ seconds, depending on the voltage drop of the cell and the pulse width. The pause time would depend on the nature of the precipitates or scale in the selected electromembrane process. A typical pulse width value falls between $10^{-2}$ and $10^3$ seconds. According to some embodiments, the apparatus described is capable of producing pauses of pulses, but it is preferable to apply inverse polarity pulses in terms of intensity, in order to lose as little working time as possible and reduce the size of the systems and the resultant capital cost.

Figure 3A:
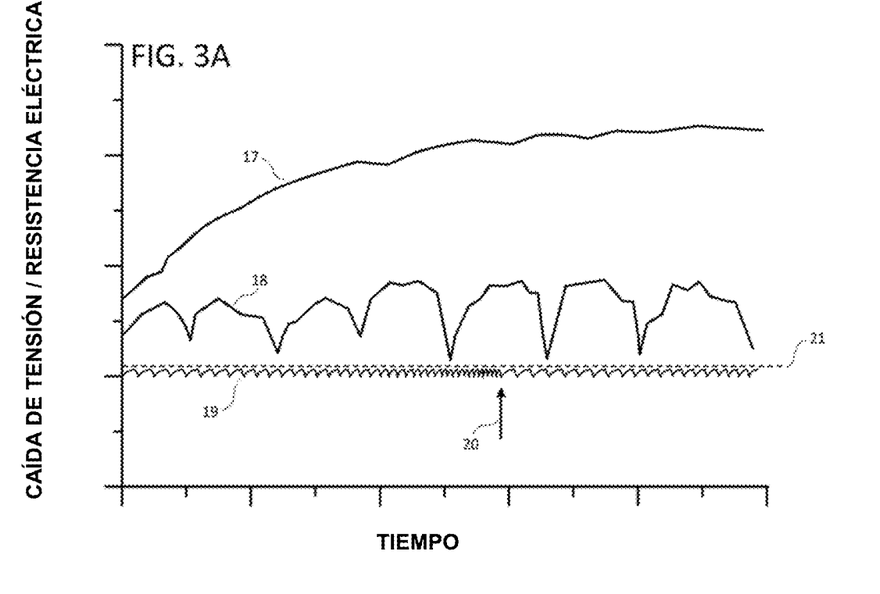
FIG. 3A is an approximate voltage drop and/or electrical resistance through a stack of membranes in conventional electromembrane processes, reversible electrodialysis and electromembrane systems with reverse polarity asymmetric pulses.

FIG. 3A is an approximate voltage drop or electrical resistance through an EM cell at 17, EDR at 18, and for EM with asymmetric polarity inversion at 19. The rate of fouling or scaling depends on the composition of the liquid currents processed, physicochemical conditions such as pH and temperature, and the availability of prior treatments.

The frequency of the pulses applied depends on the fouling on the surfaces of the membranes. Typical values vary from $10^{-2}$ to $10^3$ Hz. for example, if the membranes are fouled, the electrical resistance of the stack of membranes will increase with the resultant greater voltage drop through the cell. If said voltage drop or electrical resistance reaches a defined threshold value, 21, the device will detected and will invert the polarity for a short period (pulse width) that varies from $10^{-5}$ to $10^0$ seconds, for the purpose of disturbing the precipitation on the surface of the membranes. When this electromembrane process is continuous, the membranes will be more likely to become fouled over time in the operation. Consequently, the frequency of pulses applied would gradually be increased until reaching a defined value, 20. When the threshold frequency is reached, the operation is halted and optionally a high-frequency (cleaning) pulse is applied of about $10^1$ to $10^7$ Hz for $10^{-1}$ to $10^4$ seconds, preferably together with traditional CIP protocols for restoring the dirty or scaly membranes. At this point, the polarity can be inverted permanently in order to work at this polarity as a normal operation. This permanent inversion can be done only if the working system is EDR with the respective change of hydraulic flows.

Figure 3B:
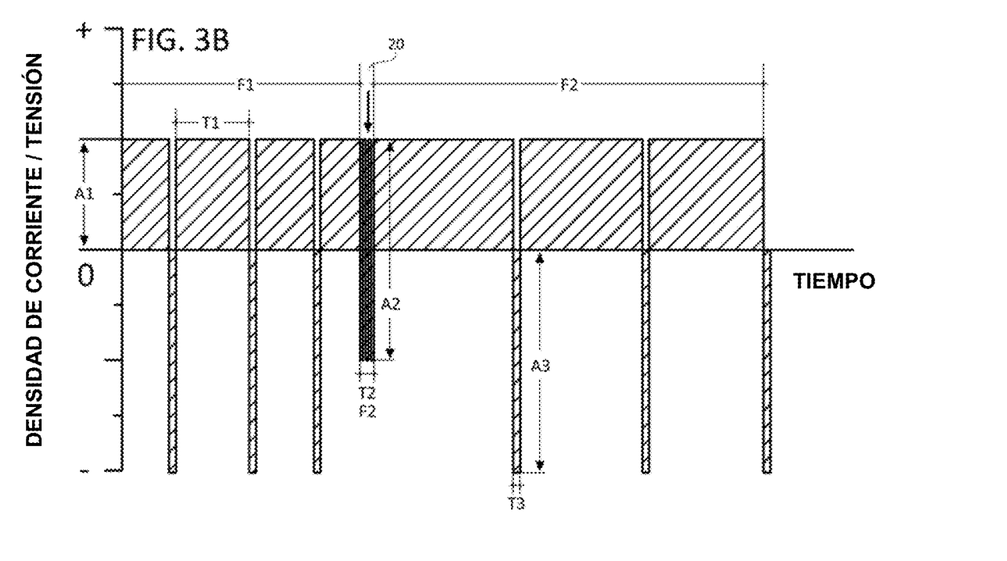
FIG. 3B is an approximate wave shape applied as reverse polarity pulses, variable frequency and optionally use of high-frequency pulses when conventional cleaning protocols are carried out.

FIG. 3B is the approximate waveform of an electromembrane process with a working amplitude AI in normal operation. The working frequency F1 varies from $10^{-2}$ to $10^3$ Hz, until reaching a predefined threshold frequency value, with a value greater than at the beginning of the process, corresponding to an indication for a deep cleaning at 20. at this time, the frequency optionally changes to higher values at F2, with values that range between $10^1$ and $10^7$ Hz, with variable amplitude, A2, with short pulse widths that range from $10^{-8}$ to $10^{-2}$ seconds, and for the treatment time T2, determined for the complete recovery of the function of the membranes, based on optimal operation and the use of chemicals for CIP. Following restoration of the membranes, the working frequency F1 will return to initial conditions until once again reaching the predefined threshold frequency. The amplitude of the pulses A3 is preferably above the current voltage/density used in normal operation, although it is necessary to avoid high voltage values (greater than 3V per membrane) due to the development of ozone, which can damage the membranes. The pulse width T3 varies as a function of amplitude A3. Thus, with low intensities more time would be required to break the concentration polarization or disturbed the formation of precipitates. When a single power source is used, A3 is equal to A1. When pause pulses are applied, A3 is equal to 0. As was mentioned, the amplitude of the pulses A3 will define the pulse width T3. Then, if A3 is reduced in amplitude, the value of T3 should increase to ensure the disruption of the new precipitates, and work time at T1 will be lost.

The following examples use the bipolar switch coupled to electromembrane systems in order to change the polarity of the system by means of the programming preferably from a microcontroller, or else from a pulse generator. The bipolar switch can ideally be incorporated into the power source or located physically as an extra component between the power source and the electromembrane cell. The second option is preferred for the upgrading of processes already installed.

In all the treatments, the working frequency can be dynamic, varying between 10-2 and 103 Hz depending on the occurrence of fouling and scaling. If the purpose of the application of pulses is the intensification of the process, then the frequency can be maintained fixed, using the same frequency range previously mentioned.

The threshold values of voltage drop/current resistance that indicate the moment to invert the polarity as a pulse are determined based on said values in normal operation, with values that fall between 1.1 and 10 times the normal operating values. The threshold value of the frequency is chosen when the work cycle falls between 80.0 and 99.9%, which indicates the time for thoroughly cleaning the membranes with CIP procedures. This value can be optimized for each system. For example, a work cycle of 80.0% means that 20.0% of the time is in a reversed polarity condition. Said work cycle is calculated based on the width of the reverse pulse and the pulse frequency. Among other variables, the chemical composition of the processed currents, the physicochemical parameters, the characteristics of the membranes, the time of operation will define all of the above-mentioned values and must be optimized for each specific process. A bipolar switch with a dedicated microcontroller can acquire the related information, such as voltage drop, current and electrical resistance density in order to evaluate the optimal time for automatically pulsing and cleaning the system.

Figure 4A:
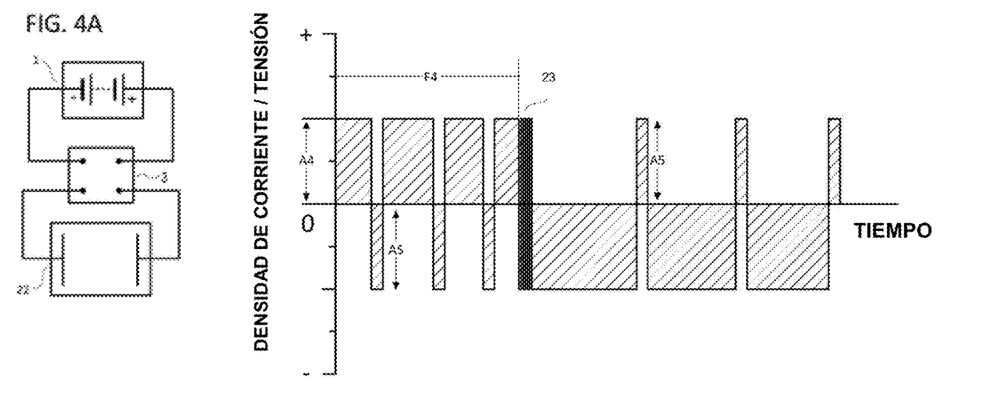
FIG. 4A is the EDR mode of operation applying asymmetric polarity in version pulses between each inversion cycle, maintaining the automatic valves for changes of hydraulic flow. The frequency of application of the pulses is variable, and pulses of high-frequency can be used optionally when chemical washes of the membranes are performed.

FIG. 4A is the upgraded EDR using inverse polarity pulses. A defined threshold frequency F4 is the indication for the permanent inversion of polarity with change of hydraulic flows at 23. At the same time as change of hydraulic flows, optionally a high-frequency pulsing can be applied with values between $10^1$ and $10^7$ Hz for $10^1$ to $10^4$ seconds. The amplitude A4, or intensity of the treatment in the work period is equal to the amplitude of pulses A5, because only one power source 1 is delivering energy to the EDR cell 22.

Here, the pulse width T4 may be variable, and the value thereof will depend on the characteristics of the process.

This upgrading will enable an increase in the work time between cycles of electrical and hydraulic polarity inversion, with a consequent decrease in loss of productivity due to the fact that the mixture of products when the hydraulic system is changed between cycles is done less frequently. The requirement for this mode of operation is the bipolar switch 3.

Figure 4B:
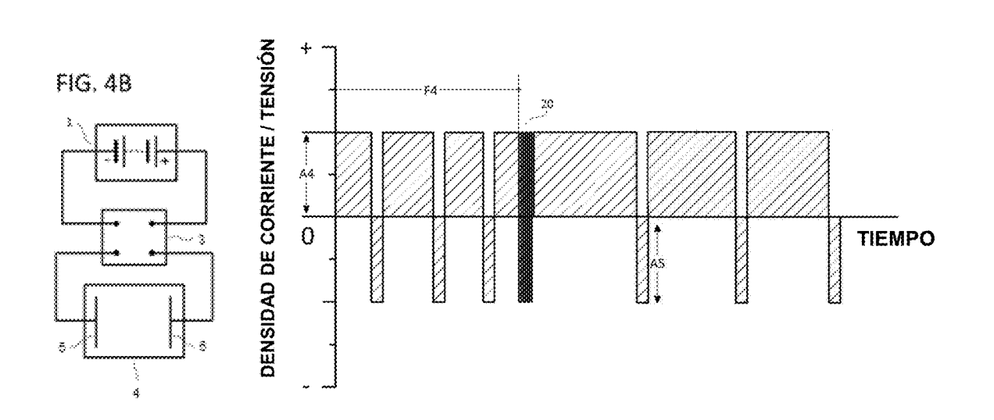
FIG. 4B is the mode of operation of electromembrane processes applying asymmetric polarity inversion pulses, with variable frequency and optional high-frequency pulses when wash protocols are applied.

FIG. 4B shows the upgrading of the electromembrane processes using inverse polarity pulses. A defined threshold frequency F4 is the indication for CIP at 20. The amplitude A4, or intensity of the operation, is equal to the amplitude of the pulses applied, A5, because only one power source 1 is energizing the system. The requirement for this upgrading is the bipolar switch 3 and a pair of suitable electrodes 5 and 6 for polarity inversion of the cell 4.

Figure 5A:
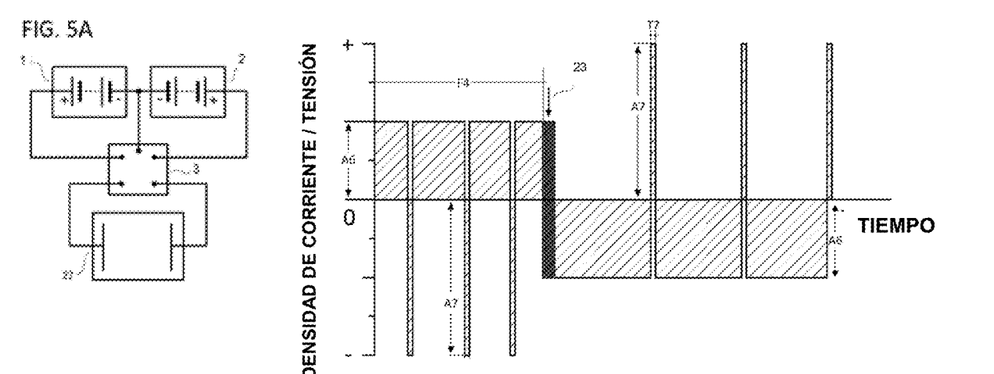
FIG. 5A is the upgraded EDR mode of operation, applying asymmetric polarity inversion pulses with higher intensities than in a normal operation, variable frequency, and optionally high-frequency when cleaning in place protocols are performed. The system is pulsed between each inversion cycle, maintaining the automatic valves for changes in hydraulic flow.

FIG. 5A is the upgrading of EDR using inverse polarity pulses with intensities greater than normal operation. A defined frequency F4 is the indication for the permanent inversion of polarity with the change of the hydraulic flows at 23. At the same time the hydraulic flows are changed, a high-frequency pulsing can optionally be applied, with values varying from $10^1$ to $10^7$ Hz for $10^1$ to $10^4$ seconds. The amplitude A6 or intensity of the treatment in the work period is different than the amplitude of the pulses A7, because two power sources 1 and 2 are supplying the system. The amplitude of the pulse is A7 can be of high intensity in order to disturb the precipitate in short times. Also, the amplitude of said pulses A7 can be 0 in order to work with pauses, although this mode is not recommended if the purpose is intensification of the process and the self-cleaning of the system. Consequently, the pulse width or pulse time T5 will be short when the intensity is increased, and they will be more extensive if the intensity is decreased, in order to achieve similar results in terms of disturbance in the formation of precipitates or disruption of the concentration polarization phenomenon. This upgrading enables an extension in the work time between electrical and hydraulic polarity inversion cycles of EDR, the decrease in loss of productivity due to the mixture of flows of liquids and the time for changing the hydraulic system. The requirement for this mode of operation is the bipolar switch 3 and the second power source 2.

Figure 5B:
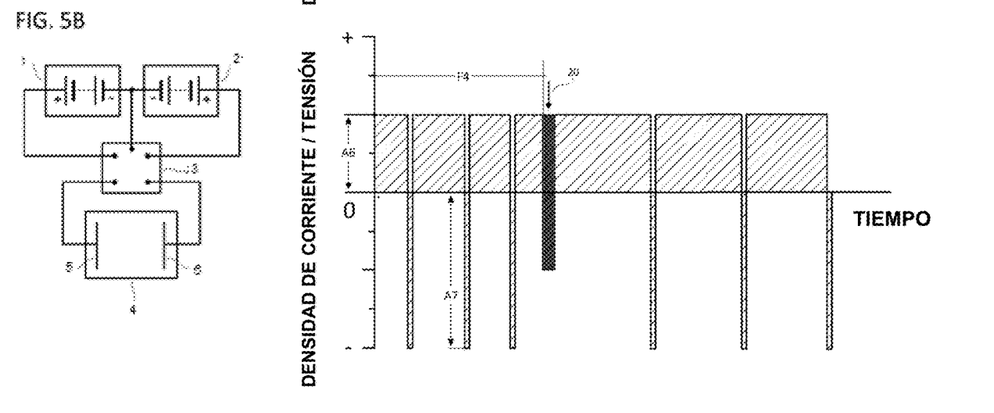
FIG. 5B is the electromembrane processes mode of operation applying asymmetric polarity inversion pulses, with higher intensities than in a normal operation, variable frequency, and optionally high-frequency when conventional cleaning protocols are being performed.

FIG. 5B shows the upgrading of the electromembrane processes using inverse polarity pulses with intensities greater than normal operation. Using two power sources 1 and 2, it is possible to apply different intensities to the EM cell 4 than in normal operation. The second power source 2 allows good performance and stability when the polarity is changed. The amplitude of the pulses A7 can be of high intensity in order to easily disturb the precipitates on the surfaces of the membranes. Pauses can also be applied if the amplitude of A7 is 0, although this mode of operation is less intensive for self-cleaning or for increasing the limit current densities. Consequently, the pulse width of the pulses T5 will be narrower with higher intensities and wider if the intensity is decreased, in order to achieve the same effect in a periodic cleaning. The requirements for this operation are a second power source 2, the bipolar switch 3 and a pair of appropriate electrodes 5 and 6 for inverting the polarity.

According to some embodiments, by applying the method and system of the invention, the following advantages can be achieved compared to the prior art: having permanent self-cleaning of the systems results in a reduction in the amount of chemicals and frequency of washes necessary to restore the function of the membrane; due to the disruption of the concentration polarization, the limit current intensity is increased in comparison with a conventional system, resulting in the intensification of the electromembrane processes; by intensifying the processes, the size of the systems is reduced, the work time is reduced and the processes are accelerated; due to the disruption of the concentration polarization, there is better control of the pH, avoiding the dissociation of the water and consequently the formation of mineral scales and precipitation of colloids; the reduction of mineral scales reduces the use of anti-scaling chemical compounds; there is an increase in production by increasing the times between change of cycles in reversible electrodialysis; new types of samples can be processed with a high content of organics or scaly species.

The invention claimed is:

1. A method for asymmetric inversion of polarity for mitigating fouling and scaling on surfaces of membranes and interrupting a concentration polarization in electromembrane processes during both a cleaning operation and a normal operation, comprising:
   providing an electromembrane cell that comprises a pair of electrodes suitable for inversion of the polarity, one electrode acts as an anode and the other as a cathode, and a set of membranes;
   providing a bipolar switch that comprises at least four solid-state switches with an H-bridge configuration for adjusting an intensity of pulses applied in the electromembrane cell, wherein under normal operating conditions some solid-state switches are closed, and other solid-state switches are open for giving direction to a current;
   providing a device that varies a frequency of application of reverse polarity and pulse width, according to system requirements when the electromembrane process is running;
   providing two power sources different from each other for adjustment of the intensity of the pulses to deliver energy to the electromembrane cell, wherein one of the sources promotes the electromembrane process under normal conditions and the other source promotes the application of reverse polarity pulses in the electromembrane cell;
   passing a direct current through the bipolar switch in different directions, toward the electrodes, in which redox reactions take place;
   generating an electrochemical potential in the electrodes in order to induce the movement of ions toward different compartments of the cell;
   providing a microcontroller or a pulse generator for instructing the bipolar switch to change polarity;
   continuously measuring a voltage drop and/or electrical resistance in the electromembrane cell;
   defining a threshold value for the voltage drop and/or for the electrical resistance of the electromembrane cell;
   cleaning the membranes once said threshold value has been reached by application of inverse polarity asymmetric pulses with variable frequency and short pulse widths with values in between $10^{-5}$ and $10^0$ seconds or by application of pause pulses;
   wherein the inverse polarity asymmetric pulses are applied with increasing frequency until reaching a threshold frequency value, the normal operation is halted and a high-frequency pulsing is applied of $10^1$ to $10^7$ Hz for $10^{-1}$ to $10^4$ seconds for thoroughly cleaning the membranes;
   wherein the threshold frequency value is based on a work cycle of the process reaching 80.0 to 99.9%, which indicates need for thorough cleaning of the membranes with cleaning in place (CIP) procedures, wherein a work cycle of 80.0% means that 20.0% of the time is in a reversed polarity condition; and
   wherein the electromembrane process is continuous.

2. The method of claim 1, wherein the microcontroller or pulse generator is programmed with the threshold values of voltage drop and/or electrical resistance that indicate need to invert the polarity in order to clean the membranes.

3. The method of claim 1, wherein the cleaning of the membranes comprises applying inverse polarity asymmetric pulses with intensities greater than those of operation under normal conditions; inverting the solid-state switches, wherein the solid-state switches that are closed are opened and those that are open are closed, inverting the polarity in the electrodes, wherein the electrode that was acting as anode acts as cathode and the electrode that was acting as cathode acts as anode, and applying pulses having a frequency of $10^2$ to $10^3$ Hz with a pulse width that varies between $10^{-5}$ and $10^0$ seconds.

4. The method of claim 1, wherein the cleaning of the membranes comprises the application of paused pulses, wherein all of the solid-state switches are open during an applied pause time, wherein said pause corresponds to pulses applied every $10^0$ to $10^3$ seconds with a pulse width that varies between $10^{-2}$ and $10^3$ seconds.

5. The method of claim 1, wherein the cleaning of the membranes is performed together with traditional cleaning protocols (CIP).

6. The method of claim 1, wherein a limit current density is increased in comparison to a limit current density achieved by a conventional system, thus intensifying the electromembrane process.

7. The method of claim 1, wherein the electromembrane process is: conventional electrodialysis (ED), reversible electrodialysis (EDR), bipolar membrane electrodialysis (BMED), capacitive deionization (CDI), electrodeionization (EDI), reverse electrodialysis (RED), microbial fuel cell systems (MFC), or desalinization by ion concentration polarization (ICP).

8. The method of claim 3, wherein the electromembrane process is a reversible electrodialysis (EDR) process, wherein the inverted polarity is maintained in order to continue with normal operation, making a change in respective hydraulic flows for the EDR process, and continuing with pulsing.

9. The method of claim 7, wherein only one power source is used if the intensity of the pulse is not adjusted and two power sources are used if the intensity of the pulses is increased.

10. The method of claim 7, wherein the electromembrane process is a reverse electrodialysis process (RED), wherein the electrochemical potential generated by the saline gradients generates electrical energy and a fraction of said energy is used for the periodic self-cleaning of the membranes and for cleaning in place (CIP) protocol methods.

11. The method of claim 1, wherein the cleaning process is carried out at frequencies that vary between $10^{-2}$ and $10^3$ Hz.

12. The method of claim 1, wherein the threshold value of the voltage drop and/or electrical resistance is 1.1 to 10 times such values under normal conditions.

* * * * *